United States Patent [19]

Strawser et al.

[11] Patent Number: 4,947,740
[45] Date of Patent: Aug. 14, 1990

[54] POPCORN POPPER

[76] Inventors: Michael G. Strawser, 3620 S. 121 E. Ave., Tulsa, Okla. 74146; William M. Sands, 2401 S. 107 E. Ave., Tulsa, Okla. 74129

[21] Appl. No.: 481,573

[22] Filed: Feb. 16, 1990

[51] Int. Cl.⁵ .............................................. A23L 1/18
[52] U.S. Cl. .................................. 99/323.6; 99/323.7; 99/323.9
[58] Field of Search .................. 99/323.5, 323.6, 323.7, 99/323.8, 323.9, 323.11, 323.4, 356, 472, 476, 477, 467, 468, 331; 221/125, 150 A; 426/450

[56] References Cited

U.S. PATENT DOCUMENTS

| | | | |
|---|---|---|---|
| 1,251,304 | 12/1917 | Tripp et al. | 99/323.9 |
| 1,332,023 | 2/1920 | Booth | 99/323.11 |
| 2,602,134 | 7/1952 | Nelson | 99/323.5 |
| 3,280,720 | 10/1966 | Kuhn | 99/323.9 |
| 4,046,066 | 9/1977 | Wood | 99/323.9 |
| 4,171,667 | 10/1979 | Miller et al. | 99/323.6 |
| 4,182,229 | 1/1980 | VandeWalker | 99/323.7 |
| 4,307,657 | 12/1981 | Avery | 99/323.7 |
| 4,417,505 | 11/1983 | Pietrobelli | 99/323.6 |
| 4,727,798 | 3/1988 | Nakamura | 99/323.9 |
| 4,848,591 | 7/1989 | Wada | 221/150 A |

Primary Examiner—Timothy F. Simone
Attorney, Agent, or Firm—Head & Johnson

[57] ABSTRACT

A single serving-on-demand-popcorn popper employs a flat member with an orifice defining an open-ended chamber of predetermined volume. The member is rotatable about an axis perpendicular to its surface and offset from the chamber. Upper and lower spaced plates sandwich the member to close the open-ended chamber. Passages angularly displaced through the upper plate sequentially communicate with the orifice during its rotation. A passage through the lower plate is aligned with one of the passages of the upper plate. A hopper in constant communication with the other passage in the upper plate gravitationally feeds unpopped kernels of corn into the chamber. A switching circuit interrupts rotation of the member to maintain the orifice in alignment with the passages through the upper plate for preselected periods of time. A blower forces air through the aligned passages in the upper and lower plates and the orifice. A screen disposed in the lower plate passage supports the kernels of corn fed in the orifice without blocking the flow of air through the orifice. A heater maintains the air flowing through the orifice at a preselected temperature. The blower operates for a preselected period of time after the orifice is aligned with the passages in the lower plate and the heater operates for a preselected period of time after the blower is activated.

20 Claims, 7 Drawing Sheets

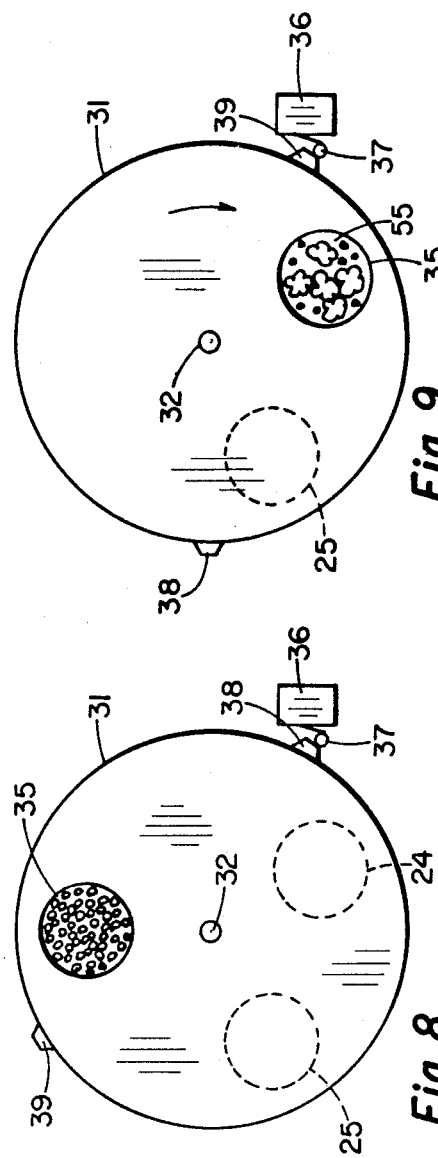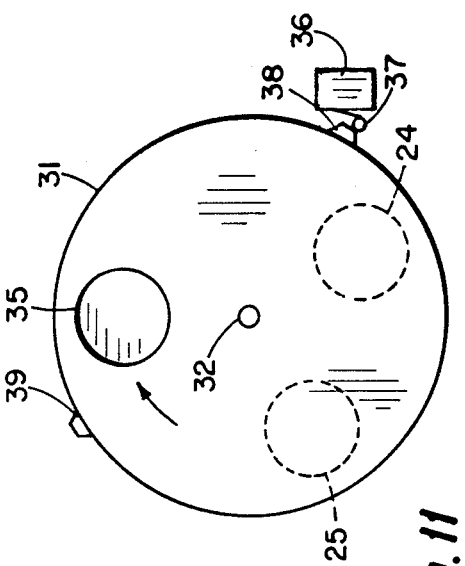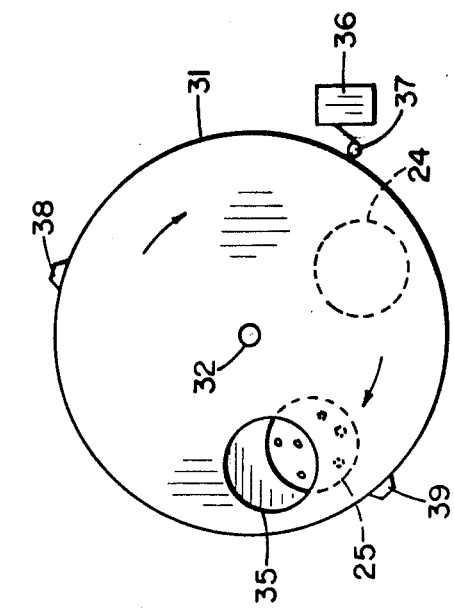
Fig. 8  Fig. 9  Fig. 10  Fig. 11

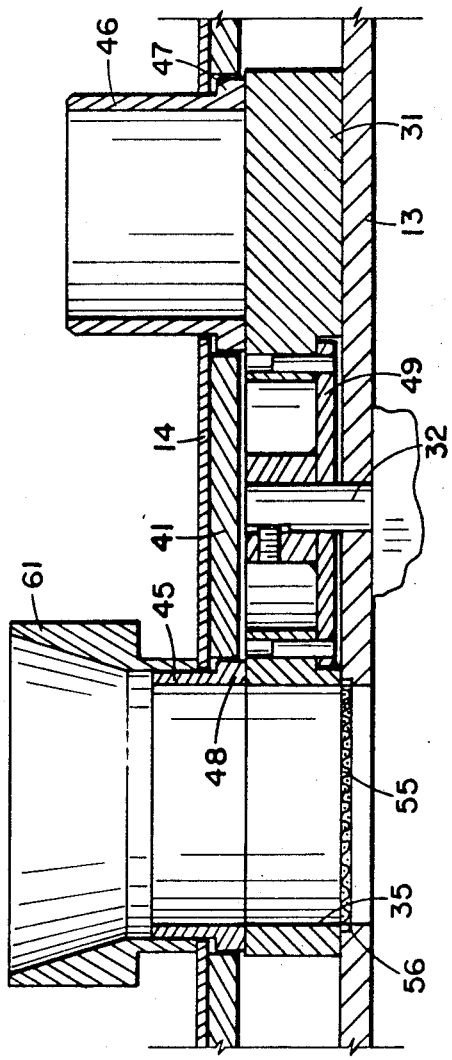
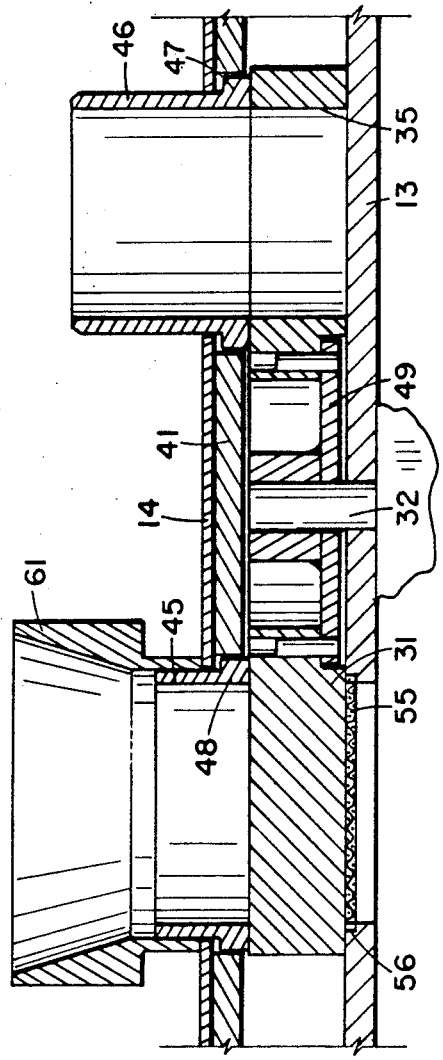

POPCORN POPPER

BACKGROUND OF THE INVENTION

This invention relates generally to popcorn machines and more particularly concerns individual serving popcorn machines operable on demand.

Old time popcorn vending machines relied on the use of a hot plate on which the unpopped kernels were heated until they popped. Machines of this type generally required the use of oil or other lubricants on the surface of the hot plate to prevent sticking or burning of the kernels. To eliminate this problem, more recent popcorn vending machines employ hot air circulatory systems rather than a hot plate. However, presently known hot air vending machines employ such extremely complex measuring and delivery systems, cooking apparata and control circuitry as to be impractical and unmarketable. Moreover, many, though not all, of these systems prepop large quantities of corn for later dispensation of small portions on demand. Consequently, the consumer is not always getting the freshest product. Attempts to devise single-serving-on-demand hot air circulating poppers, have only further complicated the machines, increasing breakdown frequency, raising the cost of the product and requiring large cabinets to house the system.

It is therefore an object of this invention to provide an individual serving, hot-air-circulating popcorn popper. A further object of this invention is to provide a popcorn popper which will rapidly prepare individual servings of popcorn upon demand. It is also an object of this invention to provide a popcorn popper that is small in size, low in cost and easy to maintain.

SUMMARY OF THE INVENTION

A hot-air-circulating, individual serving popcorn popper includes a base plate and a cover plate supported in a spaced apart relationship on a frame. An intermediate flat member sandwiched between the base plate and cover plate is journalled for rotation about a fixed axis. This rotating member has an orifice radially spaced from the axis to define a movable chamber of predetermined volume. The cover plate has an uncooked kernel inlet passage through it at the same radial distance from the axis as the orifice. A hopper above the cover plate has its discharge chute in constant communication with the kernel inlet passage to gravitationally dispense unpopped kernels of corn into the orifice. An air inlet passage in the base plate is angularly displaced from the unpopped kernel inlet passage and a popped corn outlet passage in the cover plate is aligned with the air inlet passage. The shaft of a drive motor is coupled to the rotating member to sequentially align the orifice with the unpopped kernel inlet passage and the air inlet and popped corn outlet passages. Control circuitry is provided to maintain the orifice in alignment with either the kernel inlet passage or the air inlet and popped corn outlet passages for preselected periods of time. A blower forces air into the air inlet passage, through the orifice and out the popped corn outlet passage when these passages are in alignment. A screen seated in the air inlet passage supports the kernels in the orifice without blocking the flow of air through the orifice. A heater beneath the air inlet passage heats the air flowing through the passage to a preselected temperature. The control circuitry activates the blower for a preselected period of time after the orifice is in alignment with the air inlet passage and activates the heater for preselected period of time after the blower is activated.

A debris discharge passage is also provided in the base plate and is angularly displaced between the air inlet passage and the unpopped kernel passage so that unpopped kernels of corn and other debris may be discharged from the orifice as it passes from the air inlet passage and returns to the unpopped kernel inlet passage.

The device may further include a spacing plate between the rotating member and the cover plate to hold a pair of floating cylinders which ride on the rotating member in alignment with the unpopped kernel inlet passage and the popped kernel outlet passage.

BRIEF DESCRIPTION OF THE DRAWINGS

Other objects and advantages of the invention will become apparent upon reading the following detailed description and upon reference to the drawings in which:

FIG. 8 is a diagrammatic representation of the rotating disk of the corn popper of FIG. 2 in the loading position;

FIG. 9 is a diagrammatic representation of the rotating disk of the corn popper of FIG. 2 in the popping position;

FIG. 10 is a diagrammatic representation of the rotating disk of the corn popper of FIG. 2 in the debris discharge position;

FIG. 11 is a diagrammatic representation of the rotating disk of the corn popper of FIG. 2 returned to the loading position for refilling;

FIG. 12 is a cross-sectional view of the corn popper of FIG. 2 in the position represented in FIGS. 8 and 11;

FIG. 13 is a cross-sectional view of the corn popper of FIG. 2 in the position represented in FIG. 9.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

The popcorn popper according to the present invention enables a consumer to obtain an individual serving of freshly popped popcorn upon demand. Generally demand on the popcorn popper will be made by the insertion of coins into a coin operated signal circuit typical of common vending machines. The popcorn popper is therefore hereinafter described in relation to the preferred vending machine application. However, the basic structure and operation of the popcorn popper will first be described in its generic form.

Figure 1:
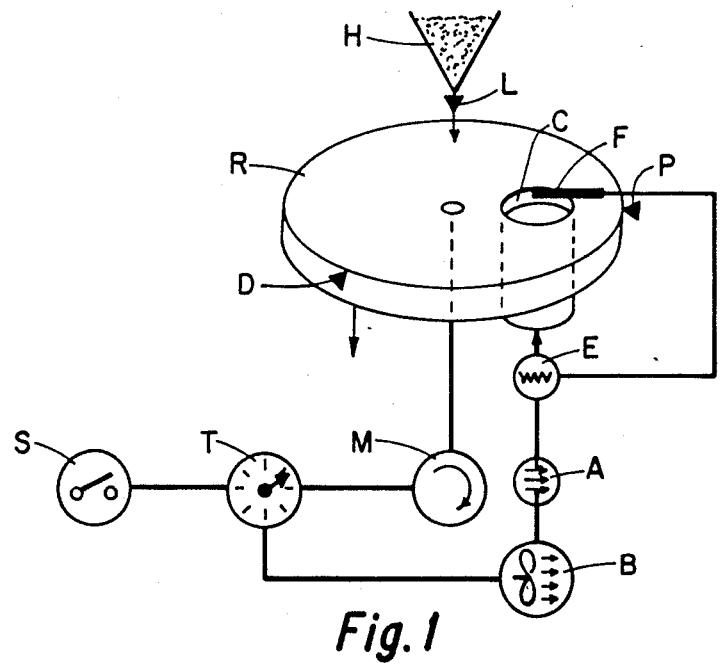
FIG. 1 is a diagrammatic representation of the corn popper.

The popcorn popper may best be understood in relation to the diagrammatic representation of FIG. 1. The popcorn popper includes a transport chamber C disposed in a rotatable member R at a point offset from the axis of rotation of the member R. The volume of the chamber C is predetermined to contain a maximum number of kernels of unpopped corn which will produce the desired individual serving of popcorn. The rotatable member R is driven about its axis by a motor M in a 360° path beginning at a load position L, traveling through a popping position P and a debris position D and returning to the load position L. At the load position L, a hopper H gravitationally feeds unpopped kernels of corn to fill the chamber C to its maximum volume. When a demand signal circuit S is operated by the consumer, a timing circuit T is set into operation. The timing circuit T first causes the loaded chamber C to be rotated from the load position L to the popping position P, at the same time initiating operation of a blower B which causes air to flow at the popping position P. An air movement sensor A senses the flow of air through the popping position P and thereupon energizes a heating element E which heats the air flowing at the popping position P. A high temperature switch F controls the heating element E to maintain the temperature in the popping position P at a selected level, typically 480° F. The timing circuit T assures that the chamber C will be in the popping position P with the blower B operating for that predetermined time necessary to pop the volume of kernels contained in the chamber C and to eject the popped corn out of the popper. The timing circuit T further assures that the heating element E will be de-energized a predetermined period of time before the blower B is de-energized. When the popping cycle is completed, the timing circuit T re-energizes the drive motor M to rotate the chamber C to the debris position D where unpopped kernels and any other debris are gravitationally ejected from the chamber C. The chamber C will continue to rotate through the debris position D and return to the load position L where the timing circuit T again interrupts the operation of the drive motor M, allowing the chamber C to be gravitationally refilled with unpopped kernels from the hopper H. The chamber C remains in this position until a consumer gives a new start signal by operating the demand signal circuit S.

A preferred embodiment of the popcorn popper is illustrated in elevation and plans in FIGS. 2 through 6. The popcorn popper is mounted on a frame consisting of side walls 11 and 12 fastened to a base plate 13 and a coVer plate 14. The base plate 13 and cover plate 14 as shown are in a spaced apart horizontal relationship, but they may be mounted in a different attitude than the horizontal. The frame also includes a support plate 15 which in this embodiment is fastened to the side plate 12 and the rear portion of the base plate 13. Flanges 16 and 17 are provided on the bottom edges of the sidewalls 11 and 12, respectively, and flanges 18 and 19 are provided on the rear portions of the side plates 12 and 13, respectively, to provide additional strength to the assembly and to provide a means for securing the assembly within a suitable housing (not shown). The frame may be held together by use of screws or bolts and nuts 21. Flanges 22 may be provided on the cover plate 14 and the support plate 15 to facilitate assembly.

Figure 2:
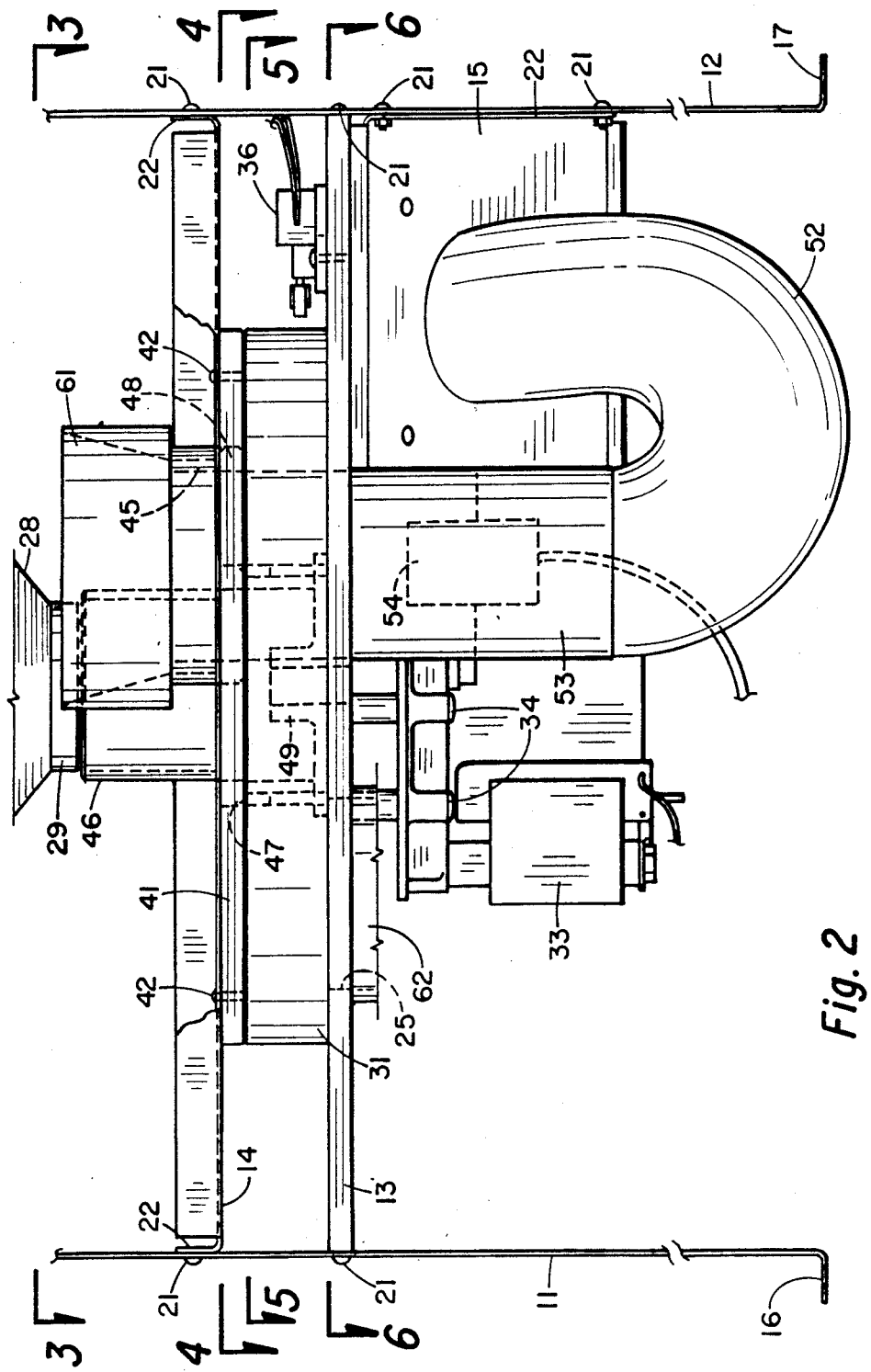
FIG. 2 is a front elevation of a preferred embodiment of the corn popper.
Figure 6:
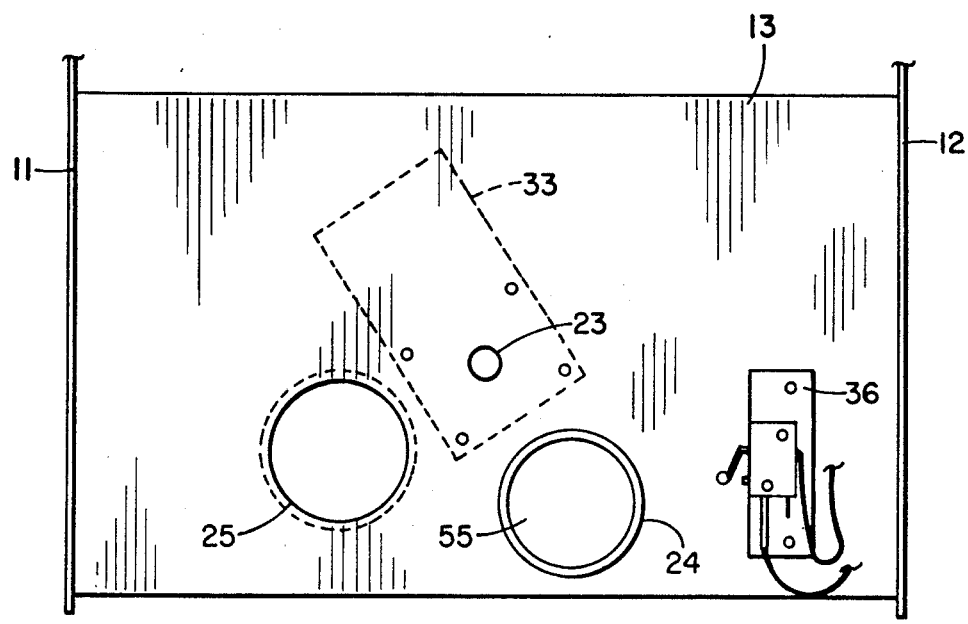
FIG. 6 is a plan view of the corn popper of FIG. 2 taken along the lines 6—6.

As can best be seen in FIGS. 2 and 6, the base plate 13 is provided with a hole 23 which establishes the central axis of the popcorn popper. The base plate 13 also has an air inlet passage 24 radially displaced from the hole 23 and a debris ejection passage 25 angularly displaced from the air inlet passage 24. As shown, both passages 24 and 25 consist of circular apertures through the base plate 13.

Figure 3:
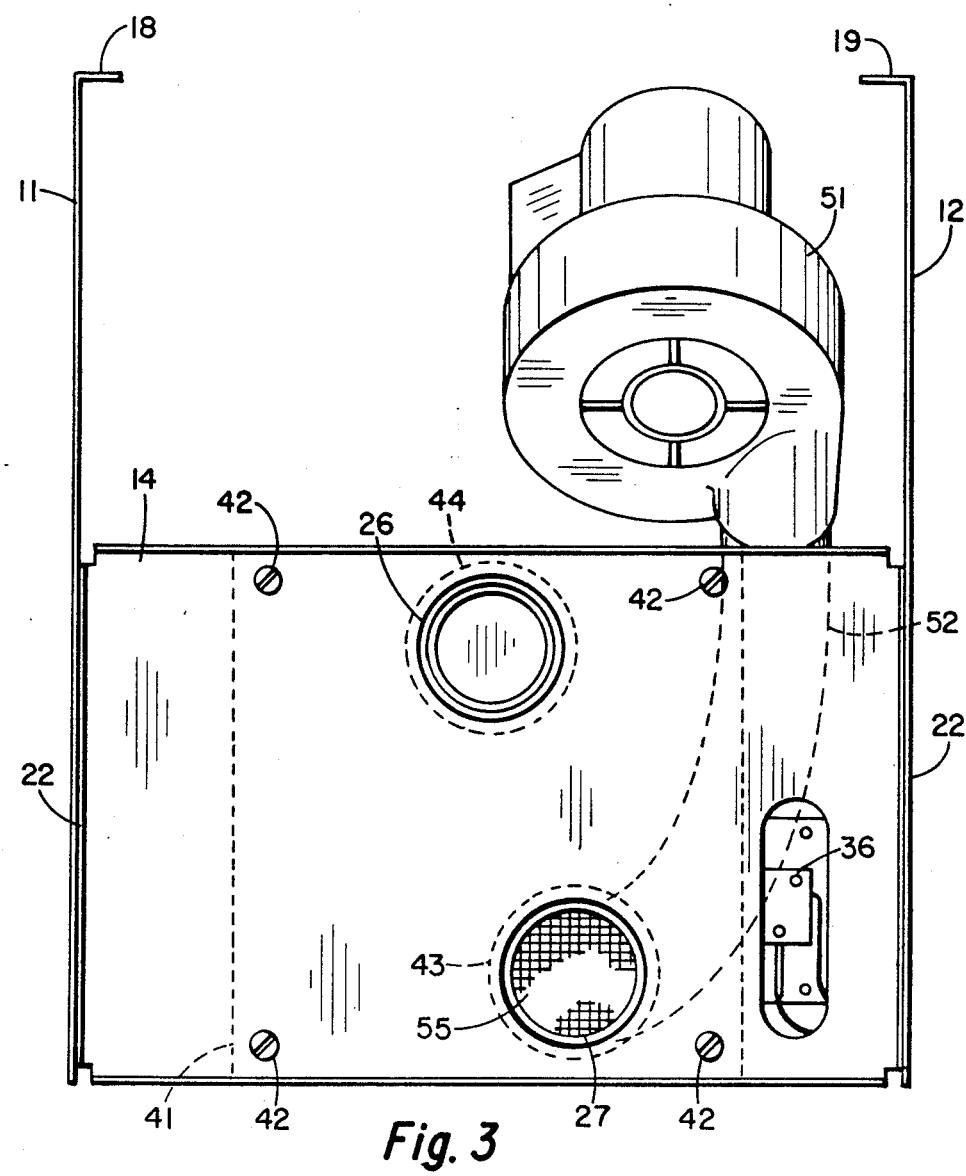
FIG. 3 is a plan view of the corn popper of FIG. 2 taken along the lines 3—3.
Figure 4:
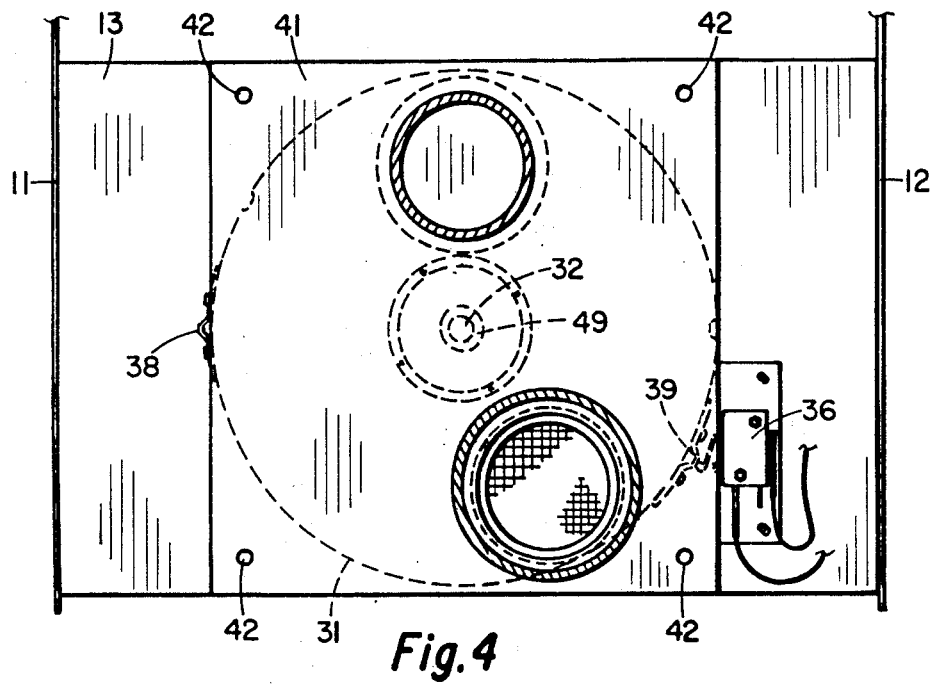
FIG. 4 is a plan view of the corn popper of FIG. 2 taken along the lines 4—4.

Looking at FIGS. 2 and 3, an unpopped kernel inlet passage 26 is provided through the cover plate 14 at a point angularly displaced between the air inlet passage 24 and the debris ejection passage 25. A popped corn outlet passage 27 is also provided through the cover plate 14 in alignment with the air inlet passage 24 of the base plate 13. As shown, both these passages 26 and 27 are circular. A hopper 28 is mounted on the frame above the unpopped kernel inlet passage 26 and has a hopper chute 29 extending from its bottom in alignment with the unpopped kernel inlet passage 26. The path of the kernels from the hopper 28 to the passage 26 is totally enclosed to prevent flow of kernels except through the passage 26. The hopper 28 gravitationally delivers unpopped kernels through the passage 26.

Figure 5:
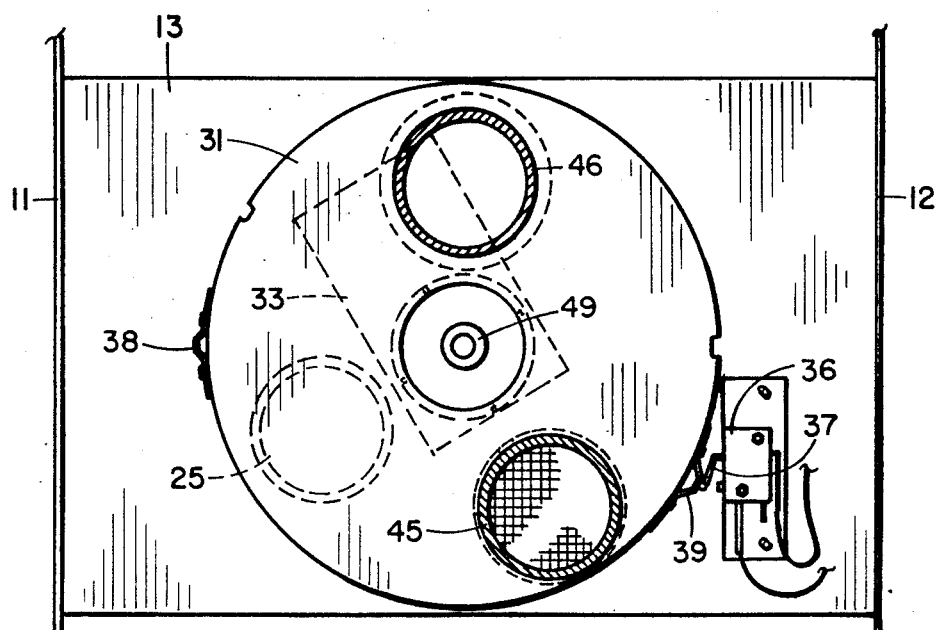
FIG. 5 is a plan view of the corn popper of FIG. 2 taken along the lines 5—5.

Turning to FIGS. 2 and 5, a rotatable member is sandwiched between the base plate 13 and the cover plate 14. As shown, the rotating member consists of a turntable or disk 31 centrally mounted on a shaft 32 of a drive motor 33 which is secured to the base plate 13. The motor shaft 32 extends through the hole 23 in the base plate 13 to connect the motor 33 to the disk 31. The motor 33 may be connected to the base plate 13 by the use of screws 34. An orifice 35 is radially offset from the center of the disk 31 so as to be sequentially alignable with the passages 23 and 25 in the base plate 13 and the passages 26 and 27 in the cover plate 14 during the rotation of the disk 31. FIGS. 12 and 13 illustrate these sequential alignments. As shown, the orifice 35 is a circular aperture through the disk 31. The radius of the orifice 35 and the thickness of the disk 31 are coordinated to provide a chamber of predetermined volume to contain the amount of unpopped corn kernels necessary to produce a selected serving of popped popcorn.

Also mounted on the base plate 13 is a microswitch 36 having a spring biased switching mechanism 37. A pair of switch operators are disposed on the circular periphery of the disk 31 so as to cooperate with the switching mechanism 37 when the orifice 35 is in alignment with either the air inlet passage 24 or the kernel inlet passage 26. This can be accomplished by the use of the external protuberances 38 and 39 shown, or could alternatively be accomplished by notches in the surface of the rotating disk 31 (not shown). In the preferred embodiment, the rotating disk 31 will be mounted on pins extending from a collar 49 which is secured to the shaft 32.

Sandwiching the rotatable member 31 between the base plate 13 and the cover plate 14 results in a closed rotatable capsule which secures its contents in place during the operation of the popper. This arrangement provides satisfactory results, but there will be a slight space between the cover plate 14 and the member 31 to permit free rotation of the member 31. Consequently, particles of unpopped kernels sheared between the edges of the kernel inlet passage 26 in the cover plate 14 and the rotating orifice 35 can become lodged in this space and eventually must be removed. To eliminate this problem, in the preferred embodiment as shown in FIGS. 2, 4, 12 and 13, the thickness of the disk 31 is substantially less than the thickness of the space between the base plate 13 and the cover plate 14. This allows a spacing plate 41 to be mounted between the disk 31 and the cover plate 14 by use of screws 42. The spacing plate has a popped corn outlet passage 43 which is aligned with the popped corn outlet passage 27 of the cover plate 14 and an unpopped kernel inlet passage 44 which is aligned with the unpopped kernel inlet passage 26 of the cover plate 14. The diameters of the passages 43 and 44 through the spacing plate 41 and the passages 26 and 27 through the cover plate are greater than the diameter of the orifice 35. Thus, a popped corn outlet cylinder 45 having an inner diameter substantially equal to the diameter of the orifice 35 and an outer diameter slightly less than the diameter of the popped corn outlet passage 27 may be seated within the popped corn outlet passage 43 of the spacing plate 41 and extend upwardly through the popped corn outlet passage 27 of the cover plate 14. Therefore, as the disk 41 rotates between the base plate 13 and the spacing plate 41, the popped corn outlet cylinder 45 rides on the top surface of the rotating disk 31 and is held in position by the cover plate 14. Similarly, the kernel inlet cylinder 46 may be seated in the kernel inlet passage 44 of the spacing plate 41 and ride on the top surface of the disk 31. The kernel inlet cylinder 46 extends upwardly through the kernel inlet passage 26 of the cover plate 14 which holds it in place. As shown, the diameters of the spacing plate 41 may be greater than the diameter of the passages in the cover plate 14 so that the cylinders 45 and 46 may have collars 47 and 48 around their lower portion with outer diameters slighty less than the diameters of their respective spacing plate passages 43 and 44. Thus the cover plate 41 will prevent the cylinders 45 and 46 from dissociation from their passages.

Figure 14:
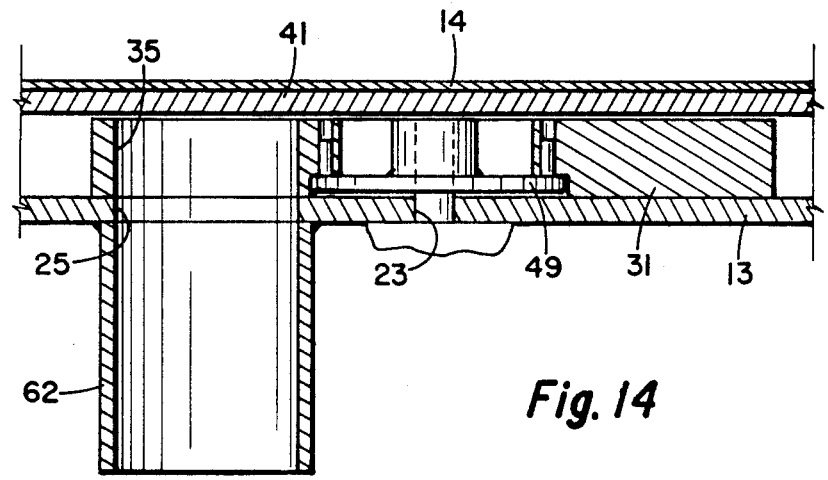
FIG. 14 is a cross-sectional view of the corn popper of FIG. 2 in the position represented in FIG. 10.

As seen in FIGS. 2 and 3, a blower 51 is mounted on the support plate 15 and a duct 52 extends from the blower air outlet to a sleeve 53 which, as shown, is welded beneath the air inlet passage 24 in the base plate 13. A heating element 54 is mounted within the sleeve 53 proximate the air inlet passage 24. A screen 55 rests in a screen seat 56 along the upper circumference of the air inlet passage 24 so that the top of the screen 55 and the top of the base plate 13 will lie in substantially the same plane. When the loaded orifice 35 is rotated to alignment with the screen 55, the screen 55 supports the kernels until the blower ejects the popped corn from the popper. An air movement sensor or thermistor 57 and a high temperature switch 58 are also mounted in the air flow path. A popped corn discharge chute 61 extends from the popped corn outlet cylinder 45 to the point of ejection from the corn popper (not shown). Looking at FIG. 14, an unpopped kernel discharge sleeve 62 is fixed to the base plate 13 below the debris ejection passage 25 to guide debris into a suitable storage receptacle (not shown).

Preferably, the non-friction frame members 11 through 15 will be cold rolled, zinc plated steel, approximately 1/16" thick, except for the base plate 13 which will be approximately ¼" thick, while friction experiencing members such as the disk 31, the spacing plate 41 and the cylinders 45 and 46 will be aluminum with a hard and anodized, teflon impregnated finish. The space between the base plate 13 and the cover plate 14 will be approximately 1" to 1 ½" and the disk 31 will be ½" to 1" thick. The center of the orifice 35 in the disk 31 will be 2" to 3" from the axis of the motor shaft 32 and the orifice will have a diameter in the range of 1 ½". The disk 31 may ride on teflon washers (not shown) between the disk 31 and the base plate 13.

The drive motor 33 will preferably be a 115 volt, 60 cycle, 6 rpm motor with a positive braking mechanism to assure that the orifice 35 in the rotating member 31 will not coast past its appropriate stop positions.

Figure 7:
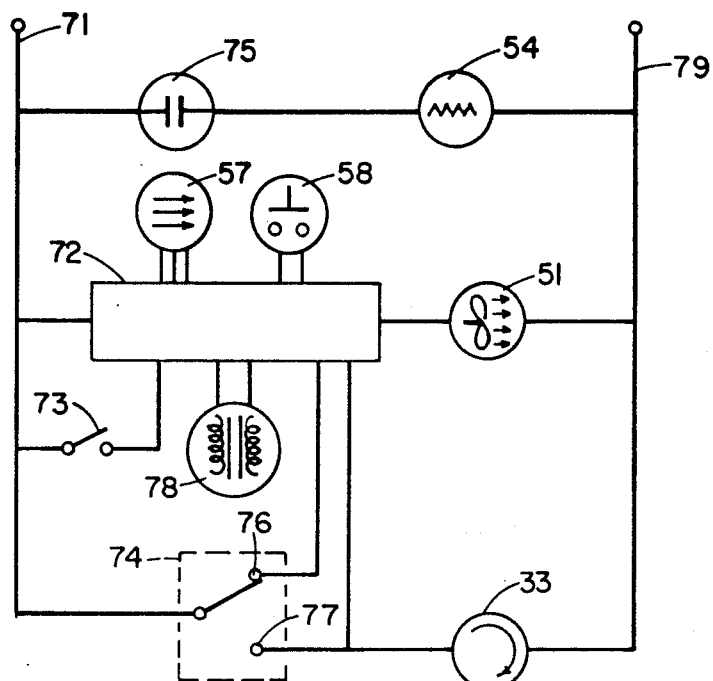
FIG. 7 is a schematic diagram illustrating the circuitry of the corn popper of FIG. 2.

The circuitry of the preferred embodiment of the popcorn popper is illustrated in FIG. 7. The 120 volt a.c. circuit for the popcorn popper includes a first conductor 71 which feeds a cycle control board 72, a coin switch 73, a gear motor cam switch 74 and a heater control block 75. When the appropriate coins have been inserted, the coin switch 73 closes sending a pulse to the control board 72 that initiates the timing circuits in the control board 72 which control the operation of the popper. When the pulse is received, the control board 72 starts the blower 51 and also sends a short pulse, in the range of 500 milliseconds, to the drive motor 33 via one terminal 76 of the gear motor cam switch 74. As shown in FIGS. 8 through 14, this pulse begins the rotation of the disk 31 to move the orifice 35 from its load position toward the popping position 24. A self-heating thermistor 57 connected to the control board 72 and located in the air flow path from the blower 51 senses air flow in the path to close the circuits in the heater control block 75, thus energizing the heater 54. A timing circuit in the controller board 72 maintains the heater control block circuit 75 in the closed condition for approximately sixty to seventy seconds. A high temperature reed switch, limit switch, or thermistor 58 is also connected to the control board 72 and senses the temperature in the air flow path at the popping position 24. The temperature limit will vary depending on the parameters of the orifice 35 and the time selected for the popping cycle. A temperature in the range of 480° F. will be acceptable. The switch 58 operates the disconnect circuitry of the heater control block 75 when the predetermined temperature is exceeded. Thus, the control board 72 monitors both air flow and temperature to control the operation of the heater 54. Once rotation of the disk 31 is initiated, the cam switch 74 switches to a second terminal 77 which maintains power through the drive motor 33 until the orifice 35 is aligned with the popping position passage 24. At this point the switching mechanism 37 of the microswitch 36 engages the switch operator 39 to disconnect the drive motor 33 and stop rotation of the disk 31 with the orifice in the popping position. The heater 54 continues to operate for the allotted 60 to 70 seconds under the control of the control board 72 and the heater control block 75. The timing circuitry of the control board 72 continues operation of the blower for approximately five to ten seconds after termination of the heater cycle to dissipate the heat at the heater 54. As the corn is popped, the air flow from the blower 51 causes the popped kernels to be evacuated through the popped corn outlet passage 27 to an appropriate popped corn receptacle (not shown). When the popping cycle is complete, the control board 72 sends a second small pulse, in the order of 500 milliseconds, to the drive motor 33 via the first terminal 76 of the cam switch 74. The cam switch 74 then switches to the second terminal 77 to continue the operation of the drive motor 33 until the orifice 35 returns to its load position. During its travel, the orifice 35 momentarily aligns with a debris ejection passage 25 so that unpopped kernels in the orifice 35 and any other particles or debris in the orifice 35 can be discharged through this passage 25 to a receptacle below (not shown). When the orifice 35 has returned to the load position, the switching mechanism 37 of the microswitch 36 engages with the operator 38 on the disk to disconnect the drive motor 33 and maintain the orifice 35 in this position. The system will remain in this condition until coins are again inserted into the coin slot 73. The control board 72 also operates a solenoid 78 which, when a pulse has been caused by operation of the coin switch 73, prevents the coin switch 73 from accepting additional coins until the orifice 35 has been refilled at the load position. The circuits are completed by the connection of the drive motor 33, the blower 51 and the heater 54 to the other conductor 79 of the 120 volt a.c. circuit. The circuits of the control board 72 are externally adjustable to permit tuning of the popper temperature and time controls to accommodate variations in climate and altitude.

Thus, it is apparent that there has been provided, in accordance with the invention, a popcorn popper that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. Apparatus for making popcorn from kernels of corn comprising:
   a frame;
   lower and upper flat, horizontal, spaced-apart members supported on said frame;
   an intermediate flat member sandwiched between said lower and upper members and journalled for rotation about a fixed vertical axis and having an orifice therethrough at a radial distance from said axis to define a movable chamber of predetermined volume;
   a kernel inlet passage through said upper member at said radial distance from said axis;
   means in constant communication with said kernel inlet passage for dispensing kernels therethrough into said orifice;
   an air inlet passage through said lower member at said radial distance from said axis and angularly displaced from said kernel inlet passage;
   a popped corn outlet passage through said upper member at said radial distance from said axis and aligned with said air inlet passage;
   means for driving said intermediate member to sequentially align said orifice with said kernel inlet passage and with said air inlet and popped corn outlet passages;
   means for interrupting said driving means to sequentially maintain said orifice in alignment with said kernel inlet passage and with said air inlet and popped corn outlet passages for preselected periods of time;
   means for blowing air into said air inlet passage, through said orifice and out of said popped corn outlet passage and for blowing popped corn out of said orifice and through said popped corn outlet passage;
   means disposed in said air inlet passage for supporting kernels dispensed into said orifice without blocking the flow of air through said orifice;
   means for heating the air blowing through said air inlet passage to a preselected temperature; and
   means for activating said blowing means for a preselected period of time after said orifice is aligned with said air inlet passage and for activating said heating means for a preselected period of time after said blowing means is activated.

2. Apparatus according to claim 1, said dispensing means comprising a hopper fixed to said frame above said kernel inlet passage, said hopper having a continuously open discharge chute in closed gravitational communication with said kernel inlet passage.

3. Apparatus according to claim 1, said driving means comprising a motor having a shaft aligned on said axis and extending into the space between said lower and upper members and means for coupling said intermediate member to said shaft for rotation therewith.

4. Apparatus according to claim 3, said motor being mounted beneath and said shaft extending upwardly through said lower member.

5. Apparatus according to claim 4 further comprising bearings disposed between said lower and intermediate members.

6. Apparatus according to claim 5, said bearings comprising teflon washers seated in said lower member.

7. Apparatus according to claim 1, said interrupting means comprising a first switch means responsive to a first mechanically prompted signal to activate said driving means, a second switch means responsive to a second mechanically prompted signal to deactivate said driving means for a predetermined time after said orifice is aligned with said air inlet passage and responsive to a third mechanically prompted signal to deactivate said driving means when said orifice is aligned with said kernel input passage until said first switch means is again mechanically prompted.

8. Apparatus according to claim 7, said first switch means being coin operated.

9. Apparatus according to claim 1, said supporting means comprising a seat disposed in said lower member along the periphery of said air inlet passage and a horizontal meshed member resting in said seat.

10. Apparatus according to claim 9, said meshed member and said lower member having coplanar upper surfaces.

11. Apparatus according to claim 1, said blowing means comprising a blower having an air outlet passage pneumatically connected to said air inlet passage.

12. Apparatus according to claim 11, said heating means comprising a resistive heating element mounted in said blower air outlet passage proximate said air inlet passage.

13. Apparatus according to claim 12 further comprising means for sensing the temperature of the air in said popcorn outlet passage and means responsive to said sensing means for connecting and disconnecting said resistive heating element as said temperature falls below a first preselected level or rises above a second preselected level respectively.

14. Apparatus according to claim 1, said activating means comprising first means for energizing said blowing means during the rotation of said orifice from said kernel inlet passage to said air inlet passage and second means for energizing said heating means after said blowing means is activated.

15. Apparatus for making popcorn from kernels of corn comprising:
    a frame;

lower and upper flat, horizontal, spaced-apart members supported on said frame;

an intermediate flat member sandwiched between said lower and upper members and journalled for rotation about a fixed vertical axis and having an orifice therethrough at a radial distance from said axis to define a movable chamber of predetermined volume;

a kernel inlet passage through said upper member at said radial distance from said axis;

means in constant communication with said kernel inlet passage for dispensing kernels into said orifice;

an air inlet passage through said lower member at said radial distance from said axis and angularly displaced from said kernel inlet passage;

a popped corn outlet passage through said upper member at said radial distance from said axis and aligned with said air inlet passage;

an unpopped kernel outlet passage through said lower member at said radial distance from said axis and angularly displaced between said popped corn outlet passage and said kernel inlet passage;

means for driving said intermediate member to sequentially align said orifice with said kernel inlet passage, with said air inlet and popped corn outlet passages and with said unpopped kernel outlet passage;

means for interrupting said driving means to maintain said orifice in alignment with said kernel inlet passage and with said air inlet and popped corn outlet passages for preselected periods of time;

means for blowing air into said air inlet passage, through said orifice and out of said popped corn outlet passage and for blowing popped corn out of said orifice and through said popped corn outlet passage;

means disposed in said air inlet passage for supporting kernels dispensed into said orifice without blocking the flow of air through said orifice;

means for heating the air blowing through said air inlet passage to a preselected temperature; and means for activating said blowing means for a preselected period of time after said orifice is aligned with said air inlet passage and for activating said heating means for a preselected period of time after said blowing means is activated.

16. Apparatus according to claim 15 further comprising a receptacle means mounted beneath said unpopped kernel outlet passage for collecting discharge from said unpopped kernel outlet passage.

17. Apparatus for making popcorn from kernels of corn comprising:

a flat member having an orifice therethrough defining an openended chamber of predetermined volume;

means for rotating said member about an axis perpendicular thereto and offset from said chamber;

upper and lower spaced apart means for sandwiching said member to close said open-ended chamber;

first and second passages angularly displaced through said upper means for sequential communication with said orifice during rotation of said member;

a first passage through said lower means aligned with said second passage of said upper means;

means in constant communication with said first passage in said upper means for gravitational feeding of unpopped kernels of corn therethrough;

means for interrupting said rotating means to maintain said orifice in alignment with said first and second passages through said said upper means for preselected periods of time;

means for blowing air through said first passage through said lower means, said orifice and said second passage through said upper means;

means disposed in said first passage through said lower means for supporting kernels fed into said orifice without blocking the flow of air through said orifice;

means for maintaining air flowing through said orifice at a preselected temperature; and means for activating said blowing means for a preselected period of time after said orifice is aligned with said second passage through said upper means and for activating said maintaining means for a preselected period of time after said blowing means is activated.

18. Apparatus according to claim 17, said upper means having first and second tubular members disposed through said first and second passages through said upper means, respectively, each of said tubular members axially floating on an upper surface of said rotating member and transversely fixed by said upper means.

19. Apparatus according to claim 17, said lower means having a second passage therethrough angularly displaced for alignment with said orifice as said orifice rotates from said second to said first passage through said upper means.

20. Apparatus according to claim 18, said lower means having a second passage therethrough angularly displaced for alignment with said orifice as said orifice rotates from said second to said first passage through said upper means.

* * * * *